United States Patent
Baharav et al.

(10) Patent No.: US 8,289,199 B2
(45) Date of Patent: Oct. 16, 2012

(54) SYSTEM AND METHOD FOR PATTERN DESIGN IN MICROWAVE PROGRAMMABLE ARRAYS

(75) Inventors: Izhak Baharav, Palo Alto, CA (US); Robert C. Taber, Palo Alto, CA (US); Gregory S. Lee, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1755 days.

(21) Appl. No.: 11/089,298

(22) Filed: Mar. 24, 2005

(65) Prior Publication Data

US 2006/0214836 A1    Sep. 28, 2006

(51) Int. Cl.
*H01Q 15/14* (2006.01)
*H01Q 3/38* (2006.01)
*G01S 13/89* (2006.01)

(52) U.S. Cl. ............. 342/6; 342/372; 342/376; 342/5; 342/179; 342/22

(58) Field of Classification Search .......... 342/176, 342/179, 180, 170–174, 146–149, 153–158, 342/368, 371–374
See application file for complete search history.

(56) References Cited

U.S. PATENT DOCUMENTS

| | | | |
|---|---|---|---|
| 3,435,453 A | 3/1969 | Howard | |
| 3,706,998 A * | 12/1972 | Hatcher et al. | 343/754 |
| 3,842,417 A * | 10/1974 | Williams | 342/158 |
| 4,336,540 A * | 6/1982 | Goodwin et al. | 342/157 |
| 4,502,025 A | 2/1985 | Carl, Jr. et al. | |
| 4,649,393 A | 3/1987 | Rittenbach | |
| 4,885,592 A | 12/1989 | Kofol et al. | |
| 4,931,803 A | 6/1990 | Shimko | |
| 4,965,602 A | 10/1990 | Kahrilas et al. | |
| 5,027,125 A | 6/1991 | Tang | |
| 5,063,529 A * | 11/1991 | Chapoton | 702/106 |
| 5,170,170 A | 12/1992 | Soumekh | |
| 5,365,237 A | 11/1994 | Johnson et al. | |
| 5,515,060 A * | 5/1996 | Hussain et al. | 342/376 |
| 5,940,030 A | 8/1999 | Hampel et al. | |
| 5,940,045 A | 8/1999 | Belcher et al. | |
| 5,969,661 A * | 10/1999 | Benjamin | 342/22 |
| 5,982,326 A | 11/1999 | Chow et al. | |

(Continued)

FOREIGN PATENT DOCUMENTS

DE    69023737 T2    4/1966

(Continued)

OTHER PUBLICATIONS

Haupt, Randy L. Interleaved Thinned Linear Arrays. Sep. 2005. IEEE Transactions on Antennas and Propagation, vol. 53, No. 9, pp. 2858-2864.*

(Continued)

*Primary Examiner* — Shelley Chen

(57) ABSTRACT

An antenna array for use within a microwave imaging system to capture a microwave image of a target is selectively programmed to optimize one or more parameters of the microwave imaging system. The array includes a plurality of antenna elements, each capable of being programmable with a respective phase shift to direct a beam of microwave radiation toward the target such that the microwave radiation from each of the plurality of antenna elements arrives at the target substantially in-phase. To optimize a parameter of the microwave imaging system, the phase shifts of selective ones of the antenna elements are altered, while still maintaining the substantially in-phase microwave radiation at the target.

25 Claims, 7 Drawing Sheets

U.S. PATENT DOCUMENTS

| | | | |
|---|---|---|---|
| 5,986,590 | A | 11/1999 | Smith et al. |
| 6,037,908 | A | 3/2000 | Phillips et al. |
| 6,043,786 | A | 3/2000 | Vannatta et al. |
| 6,054,947 | A | 4/2000 | Kosowsky |
| 6,057,761 | A | 5/2000 | Yukl |
| 6,100,843 | A * | 8/2000 | Proctor et al. ............... 342/368 |
| 6,242,740 | B1 | 6/2001 | Luukanen et al. |
| 6,353,224 | B1 | 3/2002 | Sinclair et al. |
| 6,501,414 | B2 | 12/2002 | Arndt et al. |
| 6,518,920 | B2 * | 2/2003 | Proctor et al. ............... 342/367 |
| 6,549,166 | B2 | 4/2003 | Bhattacharyya et al. |
| 6,642,889 | B1 | 11/2003 | McGrath |
| 6,792,290 | B2 * | 9/2004 | Proctor et al. ............. 455/562.1 |
| 6,965,340 | B1 * | 11/2005 | Baharav et al. ................ 342/22 |
| 6,970,133 | B2 * | 11/2005 | Chandler ............... 343/700 MS |
| 2002/0067107 | A1 | 6/2002 | Lewis |
| 2003/0034916 | A1 | 2/2003 | Kwon et al. |
| 2004/0056790 | A1 | 3/2004 | Lovberg et al. |
| 2004/0080448 | A1 | 4/2004 | Lovberg et al. |

FOREIGN PATENT DOCUMENTS

| | | |
|---|---|---|
| EP | 0929118 A2 | 4/1999 |
| EP | 0 812 028 | 12/1999 |
| GB | 2313969 | 12/1997 |
| JP | 1117434 | 5/1989 |
| JP | 2001501304 | 1/2001 |
| JP | 2005351811 | 12/2005 |
| JP | 2006145541 | 6/2006 |
| JP | 2006252637 | 9/2006 |
| JP | 2009197042 | 9/2009 |

OTHER PUBLICATIONS

GB Search Report Under Section 17 dated May 22. 2006.

GB Search Report Under Section 17 dated May 25, 2006.

David M.Sheen et al.; "Three-Dimensional Millimeter-Wave Imaging for Concealed Weapon Detection"; IEEE Transactions on Microwave Theory and Techniques, vol. 49, No. 9, Sep. 2001, pp. 1581-1592.

P.F. Goldsmith, et al.; "Focal Plane Imaging Systems for Millimeter Wavelengths"; IEEE Transactions on Microwave Theory and Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions on Microwave Theory and Techniques. vol. 49, No. 3, Mar. 2001, pp. 491-499.

Office Action of Feb. 26, 2010 from German patent application 102005062905.9 (note both the German-language and English-language translations are provided).

Office Action mailed Feb. 15, 2012 for Japanese Application No. P2006-075788 filed Mar. 20, 2006.

* cited by examiner

SYSTEM AND METHOD FOR PATTERN DESIGN IN MICROWAVE PROGRAMMABLE ARRAYS

CROSS-REFERENCE TO RELATED APPLICATIONS

This application is related by subject matter to U.S. application for patent Ser. No. 10/997,422, entitled "A Device for Reflecting Electromagnetic Radiation," U.S. application for patent Ser. No. 10/997,583, entitled "Broadband Binary Phased Antenna," and U.S. Pat. No. 6,965,340, entitled "System and Method for Security Inspection Using Microwave Imaging" all of which were filed on Nov. 24, 2004.

This application is further related by subject matter to U.S. application for patent Ser. No. 11/088,536, entitled "System and Method for Efficient, High-Resolution Microwave Imaging Using Complementary Transmit and Receive Beam Patterns," U.S. application patent Ser. No. 11/088,831, entitled "System and Method for Inspecting Transportable Items Using Microwave Imaging," U.S. application for patent Ser. No. 11/088,610, entitled "System and Method for Microwave Imaging Using an Interleaved Pattern in a Programmable Reflector Array", and U.S. application for patent Ser. No. 11/088,830, entitled "System and Method for Minimizing Background Noise in a Microwave Image Using a Programmable Reflector Array" all of which were filed on even date herewith.

BACKGROUND OF THE INVENTION

Recent advances in microwave imaging have enabled commercial development of microwave imaging systems that are capable of generating two-dimensional and even three-dimensional microwave images of objects and other items of interest (e.g., human subjects). At present, there are several microwave imaging techniques available. For example, one technique uses an array of microwave detectors (hereinafter referred to as "antenna elements") to capture either passive microwave radiation emitted by a target associated with the person or other object or reflected microwave radiation reflected from the target in response to active microwave illumination of the target. A two-dimensional or three-dimensional image of the person or other object is constructed by scanning the array of antenna elements with respect to the target's position and/or adjusting the frequency (or wavelength) of the microwave radiation being transmitted or detected.

Microwave imaging systems typically include transmit, receive and/or reflect antenna arrays for transmitting, receiving and/or reflecting microwave radiation to/from the object. Such antenna arrays can be constructed using traditional analog phased arrays or binary reflector arrays. In either case, the antenna array typically directs a beam of microwave radiation containing a number of individual microwave rays towards a point or area/volume in 3D space corresponding to a voxel or a plurality of voxels in an image of the object, referred to herein as a target. This is accomplished by programming each of the antenna elements in the array with a respective phase shift that allows the antenna element to modify the phase of a respective one of the microwave rays. The phase shift of each antenna element is selected to cause all of the individual microwave rays from each of the antenna elements to arrive at the target substantially in-phase. Examples of programmable antenna arrays are described in U.S. patent application Ser. Nos. 10/997,422, entitled "A Device for Reflecting Electromagnetic Radiation," and U.S. patent application Ser. No. 10/997,583, entitled "Broadband Binary Phased Antenna."

As a result, for each target, each antenna element is programmed with a particular phase shift to produce a beam of microwave radiation that experiences the highest constructive interference at the target. The combination of all the phase shifts assigned to the antenna elements in the array for a particular target is referred to as a pattern. The size of the pattern is the same size as the array, and each element in the pattern represents the phase shift of a corresponding antenna element in the array. In the case of a binary array, where each antenna element can introduce only one of two phase-shifts, the pattern can be represented as an array of ones and zeros.

To scan a person or other object, a number of patterns are typically pre-designed and stored for use in capturing successive microwave images of various targets associated with the person or other object. However, each pattern design is largely dictated by the frequency of the microwave radiation and the orientation of the antenna elements in the array to one or more of a microwave source (if applicable), microwave receiver (if applicable) and a particular target, and therefore, the patterns may not be optimal for various parameters of the microwave imaging system.

For example, background noise (often referred to as "clutter") that results from stray radiation from the microwave source to the microwave receiver reduces the signal-to-noise ratio (SNR) of the microwave imaging system. Although a particular pattern may create the desired constructive interference at the target, that pattern may not be optimal to reduce the background noise at the microwave receiver. As another example, the phase changes between a pair of patterns used in scanning a person or other object may cause sidelobes that increase in area as the antenna phasing changes. In addition, as the number of antenna elements that require a change in phase between successive microwave images increases, there is a corresponding increase in the power necessary for scanning the person or other object. Therefore, what is needed is a flexible design technique for designing phase-shift patterns in microwave antenna arrays.

SUMMARY OF THE INVENTION

Embodiments of the present invention provide an antenna array for use within a microwave imaging system to capture a microwave image of a target that can be selectively programmed to optimize one or more parameters of the microwave imaging system. The array includes a plurality of antenna elements, each capable of being programmable with a respective phase shift to direct a beam of microwave radiation toward the target, such that the microwave radiation from each antenna element arrives at the target substantially in-phase with the microwave radiation from the other antenna elements. To optimize a parameter of the microwave imaging system, the phase shifts of selective ones of the antenna elements are altered, while still maintaining the substantially in-phase beam of microwave radiation at the target.

In one embodiment, the parameter to be optimized is a ratio of constructive interference of the microwave radiation at the target and destructive interference of the microwave radiation at a microwave receiver. The ratio is optimized by increasing the destructive interference at the microwave receiver without correspondingly decreasing the constructive interference at the target. For example, the antenna elements selected for phase shift altering can include those antenna elements whose microwave rays have the highest phase offset from an ideal phase.

In another embodiment, the parameter to be optimized is a minimum number of phase shift changes in the array between successive microwave images. If the array is designed for use in scanning an object by capturing successive microwave images of targets associated with the object, the minimum number of phase shift changes can be optimized by selecting an order for the successive microwave images.

In a further embodiment, the parameter to be optimized is a ratio of a main lobe area to side lobe areas of the beam of microwave radiation at the target. In still a further embodiment in which the selected phase shifts for each of the antenna elements form a pattern, the parameter to be optimized is a metric associated with the digital compression of the pattern description in bits, which allows for a smaller storage space and faster handling of the pattern data.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter-wave radiation.

Figure 1:
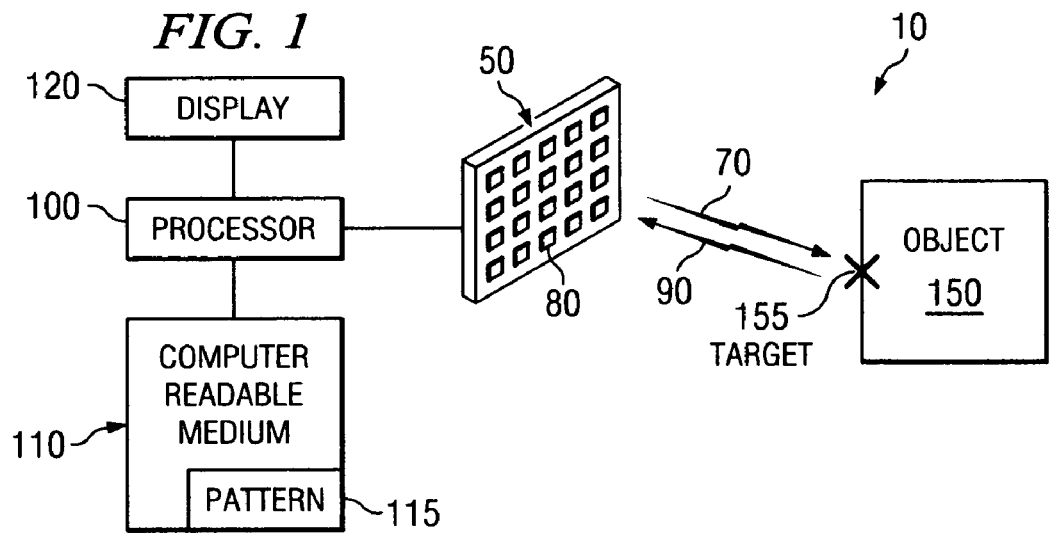
FIG. 1 is a schematic diagram of a simplified exemplary microwave imaging system including a programmable antenna array in accordance with embodiments of the present invention.

FIG. 1 is a schematic diagram of a simplified exemplary microwave imaging system 10, in accordance with embodiments of the present invention. The microwave imaging system 10 includes a one or more arrays 50 (only one of which is shown for convenience), each capable of transmitting, receiving and/or reflecting microwave radiation via antenna elements 80 to capture a microwave image of an object 150 (e.g., suitcase, human subject or any other item of interest).

In one embodiment, the array 50 includes a passive programmable reflector array composed of reflecting antenna elements 80. Each of the reflecting antenna elements is capable of being programmed with a respective phase shift to direct a beam of microwave radiation towards a target 155 (e.g., a point or area/volume in 3D space corresponding to a voxel or a plurality of voxels in an image of the object 150) on the object 150 being imaged. The phase shift can be either binary or continuous. For example, microwave radiation received by the array 50 from a microwave source (not shown) is reflected towards the target 155 on the object 150, and reflected microwave radiation reflected from the target 155 and received by the array 50 is reflected towards microwave receiver (not shown) by programming each of the individual reflecting antenna elements 80 with a respective phase shift.

In another embodiment, the array 50 includes an active transmitter/receiver array composed of active antenna elements 80 capable of producing and transmitting microwave radiation and receiving and capturing reflected microwave radiation. For example, the active array may be in the form of a transmission array. In this embodiment, a remote microwave source is not used, as the array 50 operates as the source of microwave radiation. Each of the active antenna elements in the active transmitter/receiver array is individually programmable with a respective phase shift to steer a beam of microwave radiation towards the target 155.

The microwave imaging system 10 further includes a processor 100, computer-readable medium 110 and a display 120. The processor 100 includes any hardware, software, firmware, or combination thereof for controlling the array 50 and processing the received microwave radiation reflected from the target 155 to construct a microwave image of the target 155 and/or object 150. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. However, it should be understood that other embodiments of the processor 100 may be used. The memory 110 is any type of data storage device, including but not limited to, a hard drive, random access memory (RAM), read only memory (ROM), compact disc, floppy disc, ZIP® drive, tape drive, database or other type of storage device or storage medium.

The processor 100 operates to program the array 50 using one or more patterns 115 stored in the computer-readable medium 110. Each pattern 115 contains the phase shifts of each of the individual antenna elements 80 in the array 50 to illuminate a particular target 155 on the object 150 with microwave radiation and/or receive reflected microwave radiation from a particular target 155 on the object 150. Thus, the processor 100 in conjunction with the patterns 115 and the array 50 operates to scan the object 150.

The processor 100 is further capable of constructing a microwave image of the object 150 using the intensity of the reflected microwave radiation captured by the array 50 from each target 155 on the object 150. For example, in embodiments in which the array 50 is a reflector array, the microwave receiver (not shown) is capable of combining the reflected microwave radiation reflected from each antenna element 80 in the array 50 to produce a value of the effective intensity of the reflected microwave radiation at the target 155. The intensity value is passed to the processor 100, which uses the intensity value as the value of a pixel or voxel corresponding to the target 155 on the object 150. In other embodiments in which the reflected microwave radiation represents the intensity of an area/volume of voxels, for each microwave image of a target 155 (area/volume in 3D space), the processor 100 measures a Fourier transform component of the desired image of the object 150. The processor 100 performs an inverse Fourier transform using the measured Fourier transform components to produce the image of the object 150. In operation, the microwave imaging system 10 can operate at frequencies that enable millions of targets 155 to be scanned per second.

The resulting microwave image of the target 155 and/or object 150 can be passed from the processor 100 to the display 120 to display the microwave image. In one embodiment, the display 120 is a two-dimensional display for displaying a three-dimensional microwave image of the object 150 or one or more one-dimensional or two-dimensional microwave images of the target 155 and/or object 150. In another embodiment, the display 120 is a three-dimensional display capable of displaying a three-dimensional microwave image of the object 150.

It should be understood that multiple arrays 50 may be used to scan different portions of the object 150. For example, the microwave imaging system 10 can be implemented with two arrays, each including a 1 m×1 m array of antenna elements 80 to scan half of the object 150, when the object 150 is a person of height 2 meters and width 1 meter. As another example, the microwave imaging system 10 can be implemented with eight arrays 50, each including a 0.5 m×0.5 m array of antenna elements 80 capable of scanning a quadrant of the person object 150.

Figure 2:
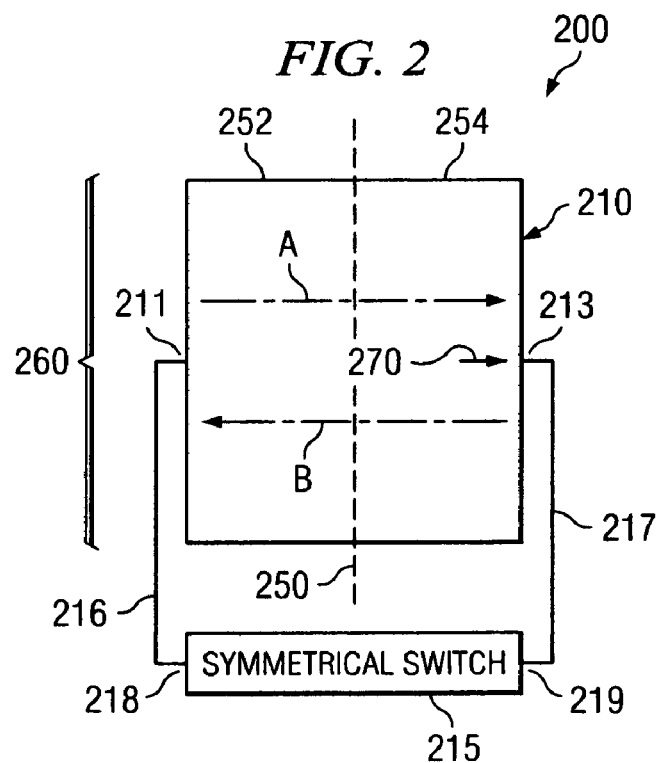
FIG. 2 illustrates an exemplary active antenna element for use in an active transmit/receive array, in accordance with embodiments of the present invention.

FIG. 2 illustrates an example of an active antenna element 200 (corresponding to an antenna element 80 in FIG. 1) for use in an active transmit/receive or reflective array. The active antenna element 200 is a broadband binary phased antenna element including an antenna 210 connected to a respective switch 215. The switch 215 can be, for example, a single-pole double-throw (SPDT) switch or a double-pole double-throw (DPDT) switch. The operating state of the switch 215 controls the phase of the respective antenna element 200. For example, in a first operating state of the switch 215, the antenna element 200 may be in a first binary state (e.g., 0 degrees), while in a second operating state of the switch 215, the antenna element 200 may be in a second binary state (e.g., 180 degrees). The operating state of the switch 215 defines the terminal connections of the switch 215. For example, in the first operating state, terminal 218 may be in a closed (short circuit) position to connect feed line 216 between the antenna 210 and the switch 215, while terminal 219 may be in an open position. The operating state of each switch 215 is independently controlled by a control circuit (not shown) to individually set the phase of each antenna element 200.

As used herein, the term symmetric antenna 210 refers to an antenna that can be tapped or fed at either of two feed points 211 or 213 to create one of two opposite symmetric field distributions or electric currents. As shown in FIG. 2, the two opposite symmetric field distributions are created by using a symmetric antenna 210 that is symmetric in shape about a mirror axis 250 thereof. The mirror axis 250 passes through the antenna 210 to create two symmetrical sides 252 and 254. The feed points 211 and 213 are located on either side 252 and 254 of the mirror axis 250 of the antenna 210. In one embodiment, the feed points 211 and 213 are positioned on the antenna 210 substantially symmetrical about the mirror axis 250. For example, the mirror axis 250 can run parallel to one dimension 260 (e.g., length, width, height, etc.) of the antenna 210, and the feed points 211 and 213 can be positioned near a midpoint 270 of the dimension 260. In FIG. 2, the feed points 211 and 213 are shown positioned near a midpoint 270 of the antenna 210 on each side 252 and 254 of the mirror axis 250.

The symmetric antenna 210 is capable of producing two opposite symmetric field distributions, labeled A and B. The magnitude (e.g., power) of field distribution A is substantially identical to the magnitude of field distribution B, but the phase of field distribution A differs from the phase of field distribution B by 180 degrees. Thus, field distribution A resembles field distribution B at ±180° in the electrical cycle.

The symmetric antenna 210 is connected to the symmetric switch 215 via feed lines 216 and 217. Feed point 211 is connected to terminal 218 of the symmetric switch 215 via feed line 216, and feed point 213 is connected to terminal 219 of the symmetric switch 215 via feed line 217. As used herein, the term symmetric switch refers to either a SPDT or DPDT switch in which the two operating states of the switch are symmetric about the terminals 218 and 219.

For example, if in a first operating state of a SPDT switch, the impedance of a channel (termed channel α) is 10Ω and the impedance of another channel (termed channel β) is 1 kΩ, then in the second operating state of the SPDT switch, the impedance of channel α is 1 kΩ and the impedance of channel β is 10Ω. It should be understood that the channel impedances are not required to be perfect opens or shorts or even real. In addition, there may be crosstalk between the channels, as long as the crosstalk is state-symmetric. In general, a switch is symmetric if the S-parameter matrix of the switch is identical in the two operating states of the switch (e.g., between the two terminals 218 and 219).

Figure 3:
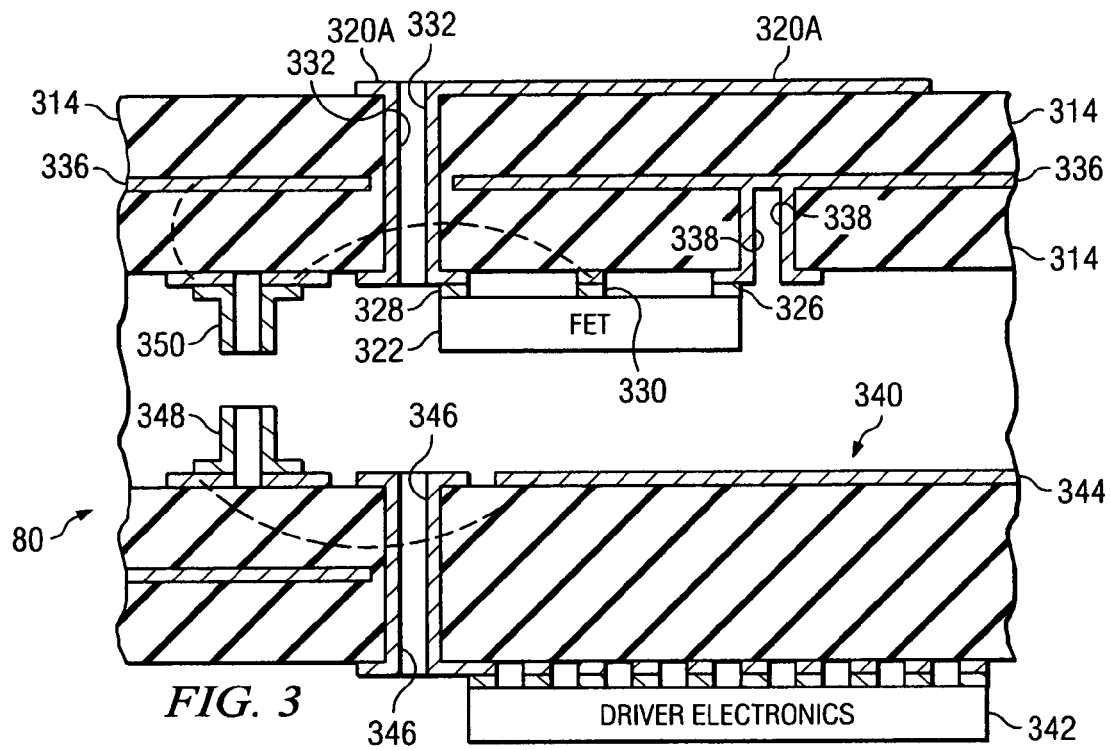
FIG. 3 is a cross-sectional view of a passive antenna element for use in a reflector array, in accordance with embodiments of the present invention.

FIG. 3 illustrates a cross-sectional view of a reflecting antenna element 300 (corresponding to antenna element 80 in FIG. 1) that operates to reflect electromagnetic radiation with varying phase depending on the impedance state of the antenna element 300. The reflecting antenna element 300 includes an antenna (patch antenna 320a) and a non-ideal switching device (surface mounted field effect transistor "FET" 322).

The reflecting antenna element 300 is formed on and in a printed circuit board substrate 314 and includes the surface mounted FET 322, the patch antenna 320a, a drain via 332, a ground plane 336 and a source via 338. The surface mounted FET 322 is mounted on the opposite side of the printed circuit board substrate 314 as the planar patch antenna 320a and the ground plane 336 is located between the planar patch antenna 320a and the surface mounted FET 322. The drain via 332 connects the drain 328 of the surface mounted FET 322 to the planar patch antenna 320a and the source via 338 connects the source 326 of the surface mounted FET 322 to the ground plane 336.

In a working product, the reflector antenna array is connected to a controller board 340 that includes driver electronics. An example controller board 340 is also depicted in FIG. 3 and includes a ground plane 344, a drive signal via 346, and driver electronics 342. The controller board 340 also includes connectors 348 that are compatible with connectors 350 of the reflector antenna array. The connectors 348 and 350 of the two boards can be connected to each other, for example, using wave soldering. It should be understood that in other embodiments, the FET 322 can be surface mounted on the same side of the printed circuit board substrate 314 as the planar patch antenna 320a. Additionally, the driver electronics 342 can be soldered directly to the same printed circuit board in which the reflecting antenna element 300 is built.

The patch antenna element 320a functions to reflect with more or less phase shift depending on the impedance level of the reflecting antenna element 300. The reflecting antenna element 300 has an impedance characteristic that is a function of the antenna design parameters. Design parameters of antennas include but are not limited to, physical attributes such as the dielectric material of construction, the thickness of the dielectric material, shape of the antenna, length and width of the antenna, feed location, and thickness of the antenna metal layer.

The FET 330 (non-ideal switching device) changes the impedance state of the reflecting antenna element 300 by changing its resistive state. A low resistive state (e.g., a closed or "short" circuit) translates to a low impedance. Conversely, a high resistive state (e.g., an open circuit) translates to a high impedance. A switching device with ideal performance characteristics (referred to herein as an "ideal" switching device) produces effectively zero impedance (Z=0) when its resistance is at its lowest state and effectively infinite impedance (Z=∞) when its resistance is at its highest state. As described herein, a switching device is "on" when its impedance is at its lowest state (e.g., $Z_{on}=0$) and "off" when its impedance is at its highest state (e.g., $Z_{off}=\infty$). Because the on and off impedance states of an ideal switching device are effectively $Z_{on}=0$ and $Z_{off}=\infty$, an ideal switching device is able to provide the maximum phase shift without absorption of electromagnetic radiation between the on and off states. That is, the ideal switching device is able to provide switching between 0 and 180 degree phase states. In the case of an ideal switching device, maximum phase-amplitude performance can be achieved with an antenna that exhibits any finite non-zero impedance.

In contrast to an ideal switching device, a "non-ideal" switching device is a switching device that does not exhibit on and off impedance states of $Z_{on}=0$ and $Z_{off}=\infty$, respectively. Rather, the on and off impedance states of a non-ideal switching device are typically, for example, somewhere between $0<|Z_{on}|<|Z_{off}|<\infty$. However, in some applications, the on and off impedance states may even be $|Z_{off}|<=|Z_{on}|$. A non-ideal switching device may exhibit ideal impedance characteristics within certain frequency ranges (e.g., <10 GHz) and highly non-ideal impedance characteristics at other frequency ranges (e.g., >20 GHz).

Because the on and off impedance states of a non-ideal switching device are somewhere between $Z_{on}=0$ and $Z_{off}=\infty$, the non-ideal switching device does not necessarily provide the maximum phase state performance regardless of the impedance of the corresponding antenna, where maximum phase state performance involves switching between 0 and 180 degree phase states. In accordance with the invention, the reflecting antenna element 300 of FIG. 3 is specifically designed to provide optimal phase performance, where the optimal phase state performance of a reflecting antenna element is the point at which the reflecting element is closest to switching between 0 and 180 degree phase-amplitude states. In an embodiment, to achieve optimal phase state performance, the antenna element 300 is configured as a function of the impedance of the non-ideal switching device (FET 330). For example, the antenna element 300 is designed such that the impedance of the antenna element 300 is a function of impedance characteristics of the FET 330.

Further, the antenna element 300 is configured as a function of the impedance of the non-ideal switching device (FET 330) in the on state, $Z_{on}$, and the impedance of the non-ideal switching device 330 in the off state, $Z_{off}$. In a particular embodiment, the phase state performance of the reflecting antenna element 300 is optimized when the antenna element 300 is configured such that the impedance of the antenna element 300 is conjugate to the square root of the impedance of the non-ideal switching device 330 when in the on and off impedance states, $Z_{on}$ and $Z_{off}$. Specifically, the impedance of the antenna element 300 is the complex conjugate of the geometric mean of the on and off impedance states, $Z_{on}$ and $Z_{off}$ of the corresponding non-ideal switching device 330. This relationship is represented as:

$$Z_{antenna}^* = \sqrt{Z_{on}Z_{off}}, \quad (1)$$

where ( )* denotes a complex conjugate. The above-described relationship is derived using the well-known formula for the complex reflection coefficient between a source impedance and a load impedance. Choosing the source to be the antenna element 300 and the load to be the non-ideal switching device 330, the on-state reflection coefficient is set to be equal to the opposite of the off-state reflection coefficient to arrive at equation (1).

Designing the antenna element 300 to exhibit optimal phase-amplitude performance involves determining the on and off impedances, $Z_{on}$ and $Z_{off}$ of the particular non-ideal switching device that is used in the reflecting antenna element 300 (in this case, FET 330). Design parameters of the antenna element 300 are then manipulated to produce an antenna element 300 with an impedance that matches the relationship expressed in equation (1) above. An antenna element 300 that satisfies equation (1) can be designed as long as $Z_{on}$ and $Z_{off}$ are determined to be distinct values.

Another type of switching device, other than the surface mounted FET 330 shown in FIG. 3, that exhibits non-ideal impedance characteristics over the frequency band of interest is a surface mount diode. However, although surface mounted diodes exhibit improved impedance characteristics over the frequency band of interest compared to surface mounted FETs, surface mounted FETs are relatively inexpensive and can be individually packaged for use in reflector antenna array applications.

In a reflector antenna array that utilizes FETs as the non-ideal switching devices, the beam-scanning speed that can be achieved depends on a number of factors including signal-to-noise ratio, crosstalk, and switching time. In the case of a FET, the switching time depends on gate capacitance, drain-source capacitance, and channel resistance (i.e., drain-source resistance). The channel resistance is actually space-dependent as well as time-dependent. In order to minimize the switching time between impedance states, the drain of the FET is preferably DC-shorted at all times. The drain is preferably DC-shorted at all times because floating the drain presents a large off-state channel resistance as well as a large drain-source capacitance due to the huge parallel-plate area of the patch antenna. This implies that the antenna is preferably DC-shorted but one wishes the only "rf short" the antenna sees be at the source. Therefore, the additional antenna/drain short must be optimally located so as to minimally perturb the antenna.

It should be understood that other types of antennas can be used in the reflecting antenna element 300, instead of the patch antenna 320a. By way of example, but not limitation, other antenna types include dipole, monopole, loop, and dielectric resonator type antennas. In addition, in other embodiments, the reflecting antenna element 300 can be a continuous phase-shifted antenna element 300 by replacing the FETs 330 with variable capacitors (e.g., Barium Strontium Titanate (BST) capacitors). With the variable capacitor loaded patches, continuous phase shifting can be achieved for each antenna element 300, instead of the binary phase shifting produced by the FET loaded patches. Continuous phased arrays can be adjusted to provide any desired phase shift in order to steer a microwave beam towards any direction in a beam scanning pattern.

Figure 4:
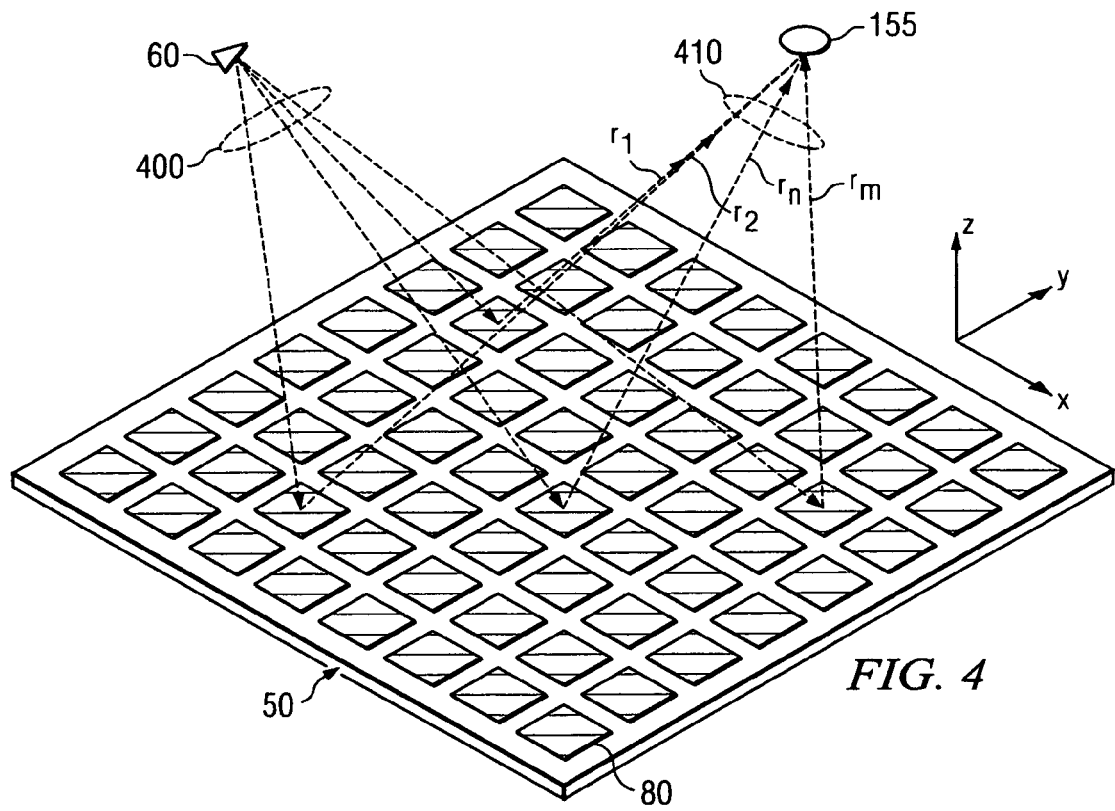
FIG. 4 is a schematic diagram of a top view of an exemplary reflector array incorporating reflecting antenna elements for reflecting microwave radiation, in accordance with embodiments of the present invention.

FIG. 4 is a schematic diagram of a top view of an exemplary array 50 for reflecting microwave radiation, in accordance with embodiments of the present invention. In FIG. 4, a beam of microwave radiation 400 transmitted from a microwave source 60 is received by various antenna elements 80 in the array 50. The microwave source can be any source sufficient for illuminating the array 50, including, but not limited to, a point source, a horn antenna or any other type of antenna. The antenna elements 80 within the array 50 are each programmed with a respective phase shift to direct a beam of reflected microwave radiation 410 towards a target 155. The phase shifts are selected to create positive (constructive) interference between all of the microwave rays, denoted $r_1$, $r_2$, $r_n$ and $r_m$, within the beam of reflected microwave radiation 410 at the target 155. Ideally, the phase shift of each of the antenna elements 80 is adjusted to provide the same phase delay for each microwave ray $r_1$, $r_2$, $r_n$ and $r_m$ of the reflected microwave radiation 410 from the source (antenna elements 80) to the target 155.

However, in accordance with embodiments of the present invention, the phase shifts applied to one or more of the antenna element can be altered to optimize one or more parameters of the microwave imaging system, as will be described in more detail below in connection with FIGS. 5-11. Examples of parameters that can be optimized include, but are not limited to, increasing the destructive interference at the microwave receiver without correspondingly decreasing the constructive interference at the target, minimizing the number of phase shift changes in the array between successive microwave images, reducing the area of sidelobes with respect to the main lobe area and enhancing compression of the phase-shift pattern containing all of the phase shifts for each antenna element 80 in the array 50 for a particular microwave image of a particular target 155.

Although not shown, it should be understood that in a similar manner, microwave radiation reflected from the target 155 and received at the array 50 can be reflected towards a microwave receiver (not shown). The microwave source 60 can be positioned either in the same spatial location as the microwave receiver as a separate antenna or as part of the microwave receiver, and illuminate the target 155 through the array 50, or can be positioned at a different spatial location from the microwave receiver and either illuminate the target 155 directly or through one of the arrays 50 (e.g., the same array 50 as the microwave receiver or a different array 50).

Figure 5A:
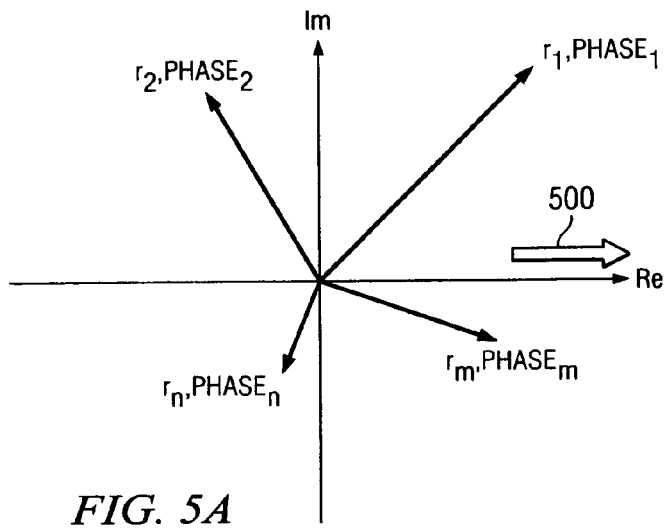
FIGS. 5A-5C are phasor representations of microwave rays.

Referring now to FIG. 5A, each microwave ray ($r_1$, $r_2$, $r_n$ and $r_m$) shown in FIG. 4 can be represented as a phasor and described with a particular magnitude and phase. For example, microwave ray $r_1$ can be described as $r_1 * e^{(j*phase1)}$, and represented as a phasor in a two-dimensional complex plane including real (Re) and imaginary (Im) components. In FIG. 5A, microwave rays $r_1$, $r_2$, $r_n$ and $r_m$ are represented as phasors $\{r_1, phase_1\}$, $\{r_2, phase_2\}$, $\{r_n, phase_n\}$ and $\{r_m, phase_m\}$. The sum of all of the phasors $\{r_1, phase_1\}$, $\{r_2, phase_2\}$, $\{r_n, phase_n\}$ and $\{r_m, phase_m\}$ determines the amplitude of the beam of microwave radiation at the target. To maximize the amplitude at the target, the microwave rays $r_1$, $r_2$, $r_n$ and $r_m$ from each of the antenna elements should have the same phase. For a continuously phased array, each antenna element can be programmed with a continuously-variable phase shift to align all of the microwave rays with the same phase.

However, in a quantized (discrete) array in which each antenna element can be programmed with only one of a particular number of discrete phase shifts, the phases of the microwave rays may only be able to be partially aligned. For example, in a binary array, each antenna element can only be programmed with one of two different binary states (e.g., 0 degree phase shift or 180 degree phase shift). Therefore, the phase shifts of each antenna element are programmed merely to maximize constructive interference and minimize (or prevent) destructive interference at the target. To prevent destructive interference at the target, an ideal phase (shown in FIG. 5A along line 500) is selected, and all antenna elements are programmed with a particular quantized phase shift to produce respective microwave rays that collectively form a beam of microwave radiation at the ideal phase 500 (e.g., the sum of all the microwave rays at the target is a phasor at the ideal phase 500).

Figure 5B:
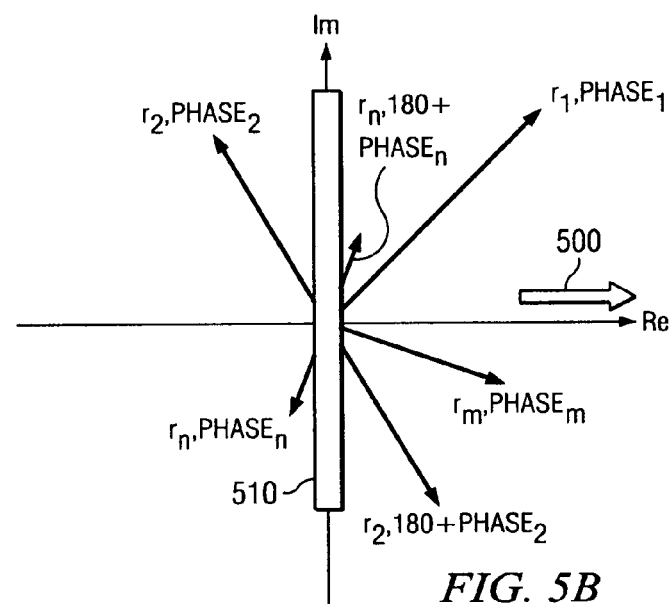

As can be seen in FIG. 5B, once the ideal phase 500 is selected, a quantization line 510 orthogonal to the ideal phase 500 can be used to determine the phase shift applied to each individual microwave ray to enable all microwave rays to sum up to the ideal phase 500. In FIG. 5B, microwave rays $r_1$ and $r_m$ are on the same side of the quantization line 510 as the ideal phase 500. Therefore, a binary phase shift of 0 degrees is applied to microwave rays $r_1$ and $r_m$ to maintain the current phase of each of these rays. However, microwave rays $r_2$ and $r_n$ are on the opposite side of the quantization line 510 than the ideal phase 500. As a result, a binary phase shift of 180 degrees is applied to microwave rays $r_2$ and $r_n$ to switch the phase of these microwave rays to the same side of the quantization line as the ideal phase 500. The sum of the microwave rays $r_1$, $r_2$, $r_n$ and $r_m$ is a beam of microwave radiation at the ideal phase 500. However, since the phases of each of the microwave rays are not perfectly aligned, the amplitude of the beam of microwave radiation at the target may be less than that achievable with a continuously variable phased array.

Figure 5C:
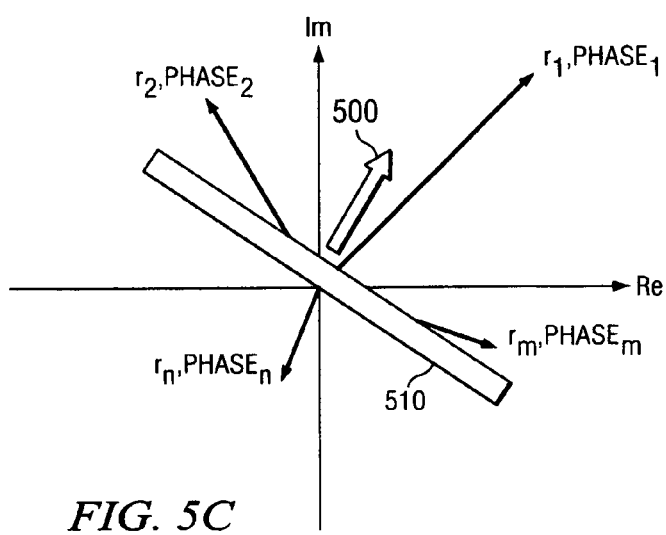

In accordance with embodiments of the present invention, as can be seen in FIG. 5C, the ideal phase 500 does not have to equal zero-angle (as shown in FIG. 5B), but rather the ideal phase 500 can be selected at any angle in order to optimize one or more parameters of the microwave imaging system. For example, in one embodiment, if one of the parameters is the number of 0 degree or 180 degree phase shifts in the array, the angle of the ideal phase 500 can be varied to produce the desired result. In FIG. 5C, the ideal phase 500 is shown drawn at an angle to the real (Re) axis and the quantization line 510 is drawn orthogonal to the direction of the ideal phase 500. With the angle chosen as it is shown in FIG. 5C, microwave rays $r_1$, $r_2$ and $r_m$ are on the same side of the quantization line 510 as the ideal phase 500, and only microwave ray $r_n$ is on the opposite side of the quantization line 510 than the ideal phase 500, which minimizes the number of 180 degree phase shifts and maximizes the number of 0 degree phase shifts in the array.

In another embodiment, if the parameter to be optimized is a minimum number of phase shift changes in the array between successive microwave images, the angle of the ideal phase 500 for each microwave image can be varied to produce the desired result. For example, if the antenna element producing microwave ray $r_2$ was programmed with a 0 degree phase shift in the previous microwave image, in order to avoid changing the phase shift for the current microwave image, the angle of the ideal phase 500 can be offset from zero-angle, as shown in FIG. 5C, to maintain the 0 degree phase shift for the current microwave image. If the ideal phase 500 is kept at zero-angle, as shown in FIG. 5B, the phase shift of the antenna element producing microwave ray $r_2$ would change from 0 degrees to 180 degrees.

Figure 6A:
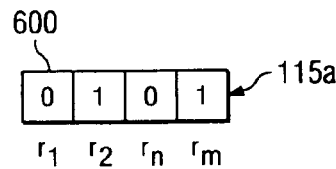
FIGS. 6A-6C illustrate exemplary portions of phase shift patterns for successive microwave images.
Figure 6B:
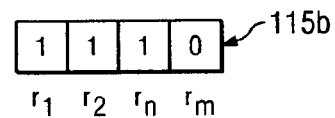
Figure 6C:
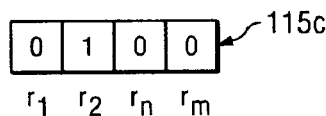

As defined above, the combination of all the phase shifts assigned to the antenna elements in the array for a particular target forms a pattern. In the case of a binary array, where each antenna element can introduce only one of two phase-shifts, the pattern can be represented as an array of ones and zeros. Exemplary binary phase-shift patterns 115a-115c for a portion of the array containing the antenna elements producing the microwave rays $r_1$, $r_2$, $r_n$ and $r_m$ shown in FIGS. 4-5 are shown in FIGS. 6A-6C. The binary phase-shift pattern 115a in FIG. 6A represents a portion of the pattern for a first microwave image of a first target, the binary phase-shift pattern 115b in FIG. 6B represents a portion of the pattern for a second microwave image of a second target and the binary phase-shift pattern 115c in FIG. 6C represents a portion of the pattern for a third microwave image of a third target.

As can be seen in FIGS. 6A-6C, each pattern 115a-115c contains phase shifts 600 applied to the antenna elements producing microwave rays $r_1$, $r_2$, $r_n$ and $r_m$. In FIG. 6A, the phase shift 600 applied to the antenna element producing microwave ray $r_1$ in the first pattern 115a is 0 degrees, while the phase shift applied to the same antenna element in the second pattern 115b is 180 degrees. Thus, there is a change in phase shift for the antenna element producing microwave ray $r_1$ between successive microwave images captured using patterns 115a and 115b. There is likewise a change in phase shift for the antenna elements producing microwave rays $r_n$ and $r_m$ between patterns 115a and 115b. To minimize the phase shift changes between successive microwave images, the ideal phase angle (500, shown in FIGS. 5A-5C) can be altered so that the phase shift remains the same between patterns 115a and 115b for the maximum number of antenna elements.

In another embodiment, minimizing the phase shift changes between successive microwave images can also be achieved by selecting an order for the successive microwave images that results in the fewest changes between patterns 115a-115c. Using the patterns 115a-115c in FIGS. 6A-6C, if pattern 115a is used first to capture a first microwave image, the second microwave image can be captured using pattern 115c and the third microwave image can be captured using pattern 115b to result in the fewest phase shift changes between patterns. If pattern 115a is followed by pattern 115b, the phase shifts programmed for three of the antenna elements (corresponding to microwave rays $r_1$, $r_n$ and $r_m$) change. However, if pattern 115a is followed by pattern 115c, the phase shift programmed for only one of the antenna elements (corresponding to microwave ray $r_m$) changes. Similarly, if pattern 115c is followed by pattern 115b, the phase shift programmed for only two of the antenna elements (corresponding to microwave rays $r_1$ nd $r_n$) changes.

Thus, the total number of phase shift changes using a pattern order of patterns 115a, 115c and 115b is only three, whereas the total number of phase shift changes using a pattern order of patterns 115a, 115b and 115c is five. Reducing the number of phase changes between a pair of patterns used in scanning a person or other object reduces the risk of one of the elements not changing phase shift fast enough. In addition, reducing the number of phase changes between successive microwave images reduces the power necessary for scanning the person or other object.

Although the patterns described herein are simple patterns of the type that can most readily be used with a single point-source, it should be understood that embodiments of the present invention are equally applicable to more complicated patterns for use with horn antennas and other antenna types. For example, a horn antenna can be approximated as multiple point-sources, appropriately weighted, and the pattern can be designed to accommodate the multiple point-sources. In addition, it should be understood that embodiments of the present invention are also applicable to other types of quantized arrays, in which the phase shift between the two states is different than 180 degrees.

It should further be understood that there are a number of different microwave imaging system parameters that can be optimized using embodiments of the present invention, and the present invention is not limited to the particular parameters discussed herein. For example, in another embodiment, the parameter to be optimized can be a ratio of constructive interference of the microwave radiation at the target and destructive interference of the microwave radiation at a microwave receiver. As discussed above, background noise resulting from stray radiation from the microwave source to the microwave receiver reduces the signal-to-noise ratio (SNR) of the microwave imaging system. Increasing the destructive interference of the stray radiation at the receiver increases the SNR. Therefore, in accordance with embodiments of the present invention, the phase shifts programmed for each antenna element can be designed so as to maximize the destructive interference at the receiver, while maintaining sufficient constructive interference at the target.

Figure 7:
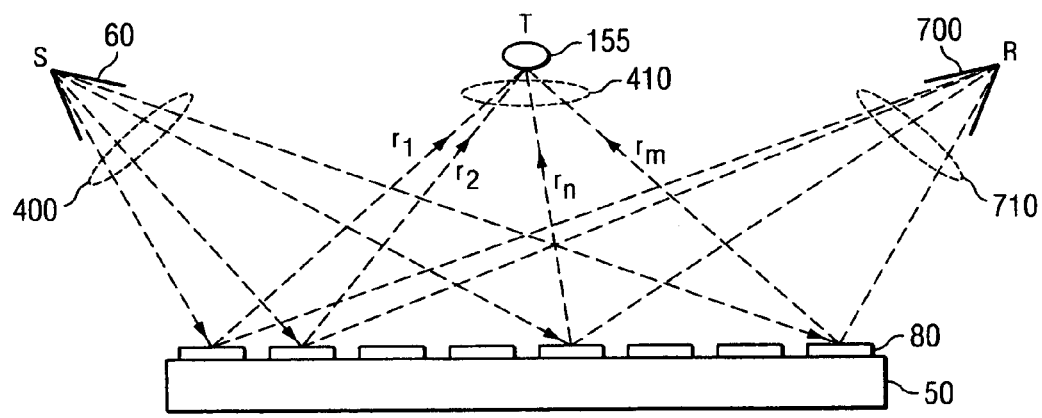
FIG. 7 is a schematic diagram illustrating leakage microwave radiation between a microwave source and a microwave receiver.

Referring now to FIG. 7, there is illustrated leakage (stray) microwave radiation between a microwave source 60 and a microwave receiver 700. As in FIG. 4, in FIG. 7, a beam of microwave radiation 400 transmitted from the microwave source (antenna) 60 is received by various antenna elements 80 in the array 50. The antenna elements 80 are each programmed with a respective phase shift to direct a beam of reflected microwave radiation 410 towards a target 155. The phase shifts are selected to create positive (constructive) interference between all of the microwave rays, denoted $r_1$, $r_2$, $r_n$ and $r_m$, within the beam of reflected microwave radiation 410 at the target 155. At the same time, some of the microwave radiation from the source 60 is reflected off of the array 50 in a beam of stray microwave radiation 710 towards the microwave receiver 700. To minimize the effect of the stray microwave radiation 710 at the receiver 700 (i.e., increase the SNR), the destructive interference at the microwave receiver can be increased without a proportional decrease in the constructive interference at the target.

Referring again to FIG. 5B, microwave rays $r_2$ and $r_n$ have a higher phase offset from the ideal phase 500 than microwave rays $r_1$ and $r_m$. Thus, microwave rays $r_1$ and $r_m$ contribute the most to the amplitude of the microwave radiation at the target (since these microwave rays are closest to the ideal phase 500 and farthest from the quantization line 510), and microwave rays $r_2$ and $r_n$ contribute the least to the amplitude of the microwave radiation at the target (since these microwave rays are closest to the quantization line 510). Therefore, altering the phase shift of the antenna elements whose microwave rays have the highest phase offset from the ideal phase (i.e., microwave rays $r_2$ and $r_n$) can enhance the destructive interference at the receiver without producing a significant change in the constructive interference at the target. For example, instead of programming the antenna elements producing microwave rays $r_2$ and $r_n$ with a 180 degree phase shift, as suggested above to better align the rays with the ideal phase 500, the antenna elements producing microwave rays $r_2$ and $r_n$ can be programmed with a 0 degree phase shift to increase the destructive interference at the microwave receiver without proportionally decreasing the constructive interference at the target. It should be understood that in other embodiments, the same principles can be applied to minimize the area of the sidelobes by increasing the destructive interference in the sidelobes at the target, while still maintaining sufficient constructive interference in the main lobe at the target.

Figure 8A:
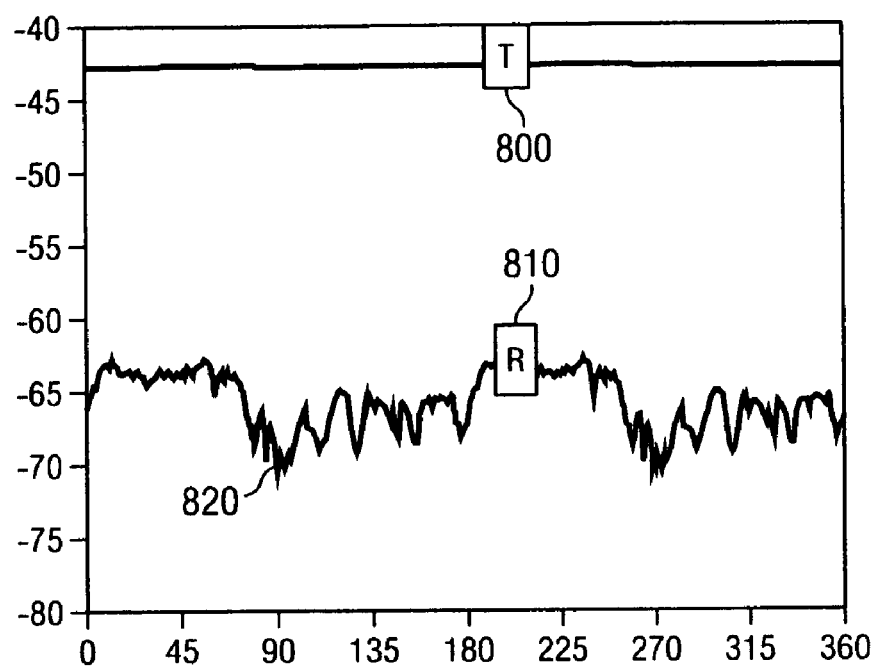
FIGS. 8A and 8B are graphs illustrating exemplary signal-to-noise ratios at the microwave receiver.
Figure 8B:
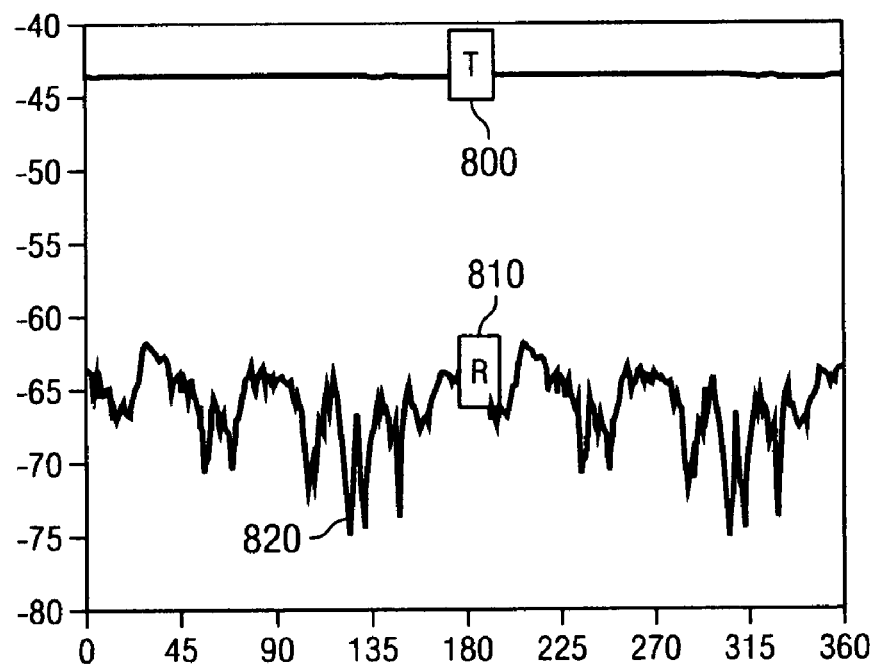

FIGS. 8A and 8B are graphs illustrating exemplary signal-to-noise ratios at the microwave receiver. The signal from the target is labeled 800 and denoted T, and the noise at the receiver is labeled 810 and denoted R. FIG. 8A represents the signal 800 and noise 810 using the phase shifts shown in FIG. 5B, in which the antenna elements are programmed with phase shifts designed to better align the rays with the ideal phase 500. The abscissa denotes the different possible ideal phase 500 choices, which can change from 0 to 360 degrees. FIG. 8B represents the signal 800 and noise 810 using phase shifts designed to increase the destructive interference at the receiver. In FIG. 8A, the minimum noise level 820 is approximately −70 db, whereas in FIG. 8B, the minimum noise level 820 is approximately −75 db. Thus, the SNR in FIG. 8B is higher than the SNR in FIG. 8A. In addition, there is no significant difference in the signal level 800 from the target between FIGS. 8A and 8B.

Figure 9:
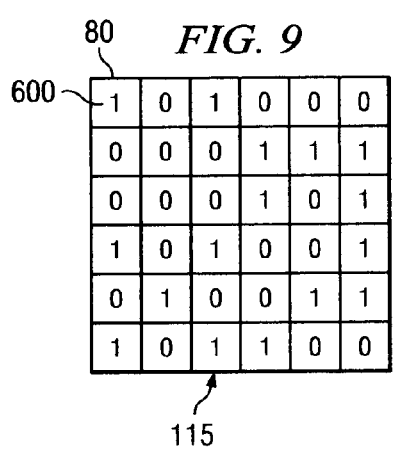
FIG. 9 illustrates an exemplary portion of a phase shift pattern for an array.
Figure 12:
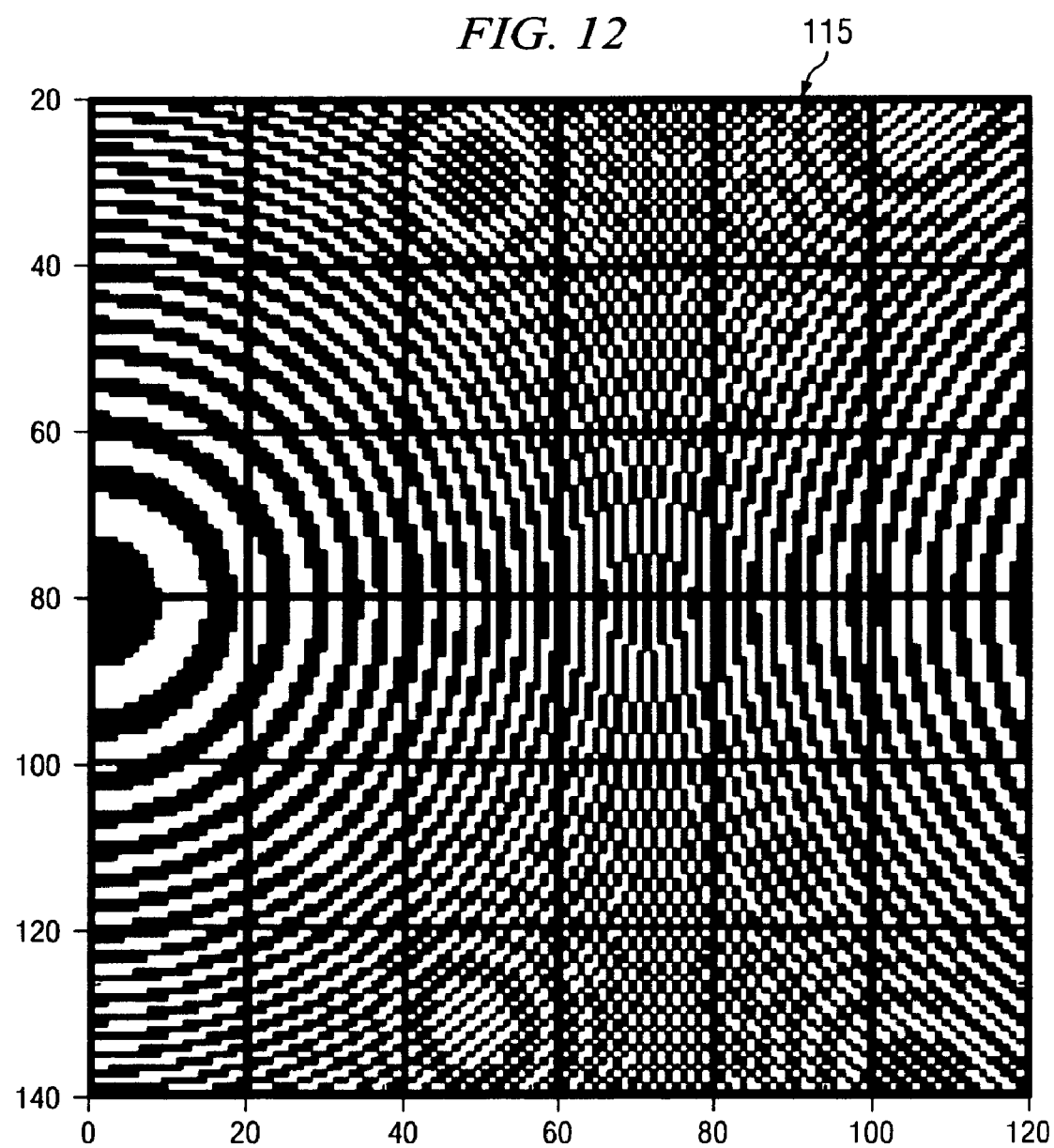
FIG. 12 illustrates an exemplary global phase shift pattern for an array.

Another parameter that can be optimized in accordance with embodiments of the present invention is a metric associated with compression of the pattern. A portion of an exemplary binary phase-shift pattern 115 is shown in FIG. 9. The size of the pattern 115 is the same size as the array, and each element 600 in the pattern 115 represents the phase shift of a corresponding antenna element 80 in the array. At a high level, as shown in FIG. 12, there is a global structure to the pattern 115. However, when looking at the individual phase shifts 600 at a micro level (as is shown in FIG. 9), the pattern 115 appears somewhat random. If the pattern 115 can be divided into neighborhoods of elements, each with an entropy less than the total number of elements in the neighborhood, the pattern 115 can be compressed to reduce the amount of memory space needed to store the pattern 115 and increase the handling speed of the pattern data.

Figure 10A:
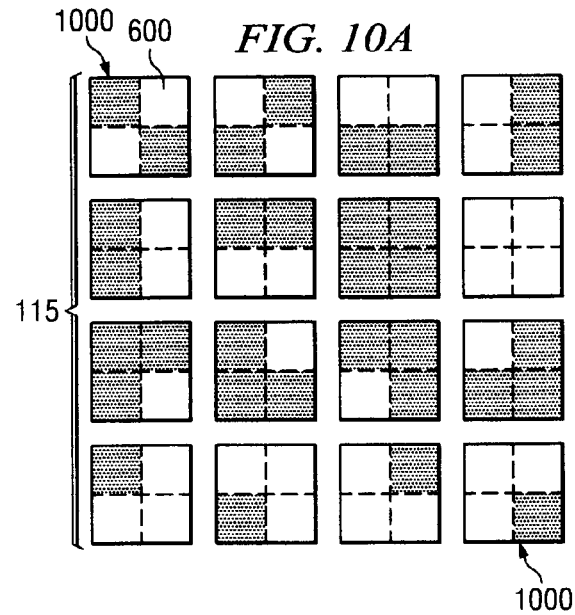
FIGS. 10A and 10B illustrate exemplary compressible portions of phase shift patterns.
Figure 10B:
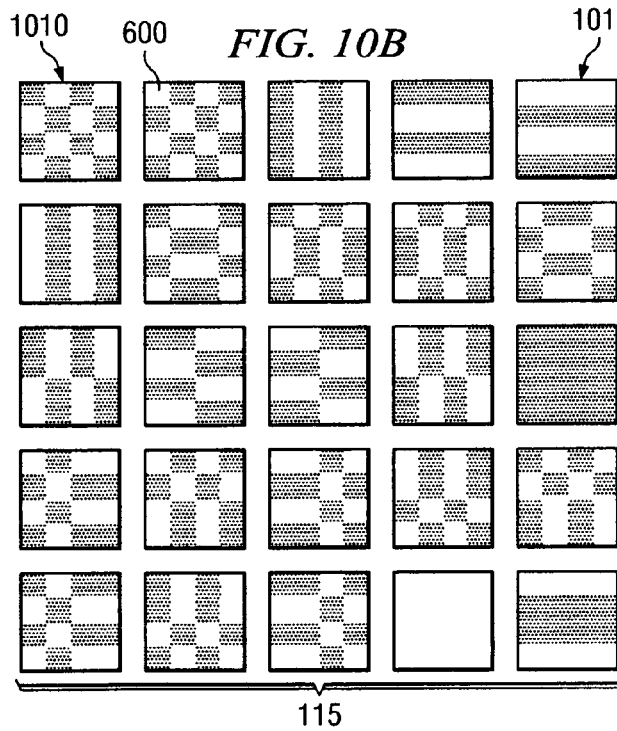

For example, as shown in FIG. 10A, various neighborhoods 1000 of square 2×2 elements 600 are shown. Each neighborhood 1000 has an entropy of 3, which means that three bits are needed to describe the four elements 600. As another example, as shown in FIG. 10B, various neighborhoods 1010 of square 4×4 elements 600 are shown. Each neighborhood 1010 has an entropy of 10, which means that ten bits are needed to describe the sixteen elements 600. To decrease the entropy of a neighborhood 1000 or 1010, and thus increase the compression, the number of possible neighborhoods 1000 or 1010 or a particular size block of elements 600 must be reduced. In both FIGS. 10A and 10B, the neighborhoods are shown from most frequently used at the top left to the least frequently used at the bottom right. If the least frequently used neighborhoods can be removed as possibilities, the number of bits needed to describe the elements 600 in a neighborhood 1000 or 1010 decreases (entropy decreases). This will lead to "lossy compression" with a higher compression ratio, but also higher distortion than "lossless compression."

For example, if all of the neighborhoods 1000 on the bottom row in FIG. 10A are removed as possibilities, the phase shift of one or more elements 600 in a pattern that contains one or more of the removed neighborhoods must be changed. Referring again to FIG. 9, the top left 2×2 square block of elements 600 resembles one of the bottom neighborhoods 1000 in FIG. 10A, specifically, the bottom left neighborhood 1000. Thus, to reduce the entropy and increase the compression of the pattern 115, the phase shift of at least one of the elements 600 in the top left 2×2 square block of elements 600 in FIG. 9 must be changed so the block of elements 600 resembles one of the remaining possible neighborhoods 1000 in FIG. 10A.

It should be understood that other compression metrics can be used in lieu of or in addition to the metrics described above. For example, to determine which individual antenna elements or blocks of antenna elements should be altered, the contribution that each antenna element or block of antenna elements makes to the amplitude of the microwave radiation at the target can be used as a weighting metric for lossy compression.

Figure 11:
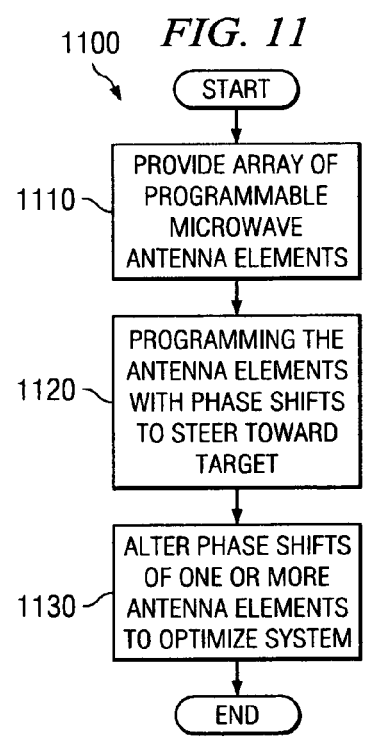
FIG. 11 is a flow chart illustrating an exemplary process for optimizing a microwave imaging system for capturing a microwave image of a target, in accordance with embodiments of the present invention.

FIG. 11 is a flow chart illustrating an exemplary process 1100 for optimizing a microwave imaging system for capturing a microwave image of a target, in accordance with embodiments of the present invention. Initially, an array of programmable microwave antenna elements is provided at block 1110. At block 1120, a pattern is designed for programming each of the antenna elements in the array with a respective phase shift to direct a beam of microwave radiation towards a target. At block 1130, the programmed phase shift of one or more of the antenna elements in the pattern is altered in order to optimize one or more parameters of the microwave imaging system.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. An array for use in a microwave imaging system to capture a microwave image of a target, comprising:
    a plurality of antenna elements, each capable of being programmable with a respective phase shift to direct a beam of microwave radiation toward the target such that the microwave radiation from each of the plurality of antenna elements arrives at the target substantially in-phase;
    wherein the phase shifts of selective ones of the plurality of antenna elements are altered to optimize a minimum number of phase shift changes in the array between successive microwave images.

2. The array of claim 1, wherein each of said plurality of antenna elements are discrete phase-shifted antenna elements.

3. The array of claim 1, wherein each of said plurality of antenna elements is a reflecting antenna element, and wherein each said reflecting antenna element is configured to receive microwave illumination from a microwave source and reflect the microwave illumination based on the respective programmed phase shift to direct the beam of microwave radiation toward the target.

4. The array of claim 3, wherein each said reflecting antenna element is configured to receive a reflected beam of microwave radiation reflected from the target and reflect the reflected beam towards a microwave receiver based on the respective programmed phase shift associated with each said reflecting antenna element.

5. The array of claim 4, wherein the parameter to be optimized is a ratio of constructive interference of the microwave radiation at the target and destructive interference of the microwave radiation at the microwave receiver.

6. The array of claim 5, wherein the ratio is optimized by increasing the destructive interference at the microwave receiver without a corresponding decrease in the constructive interference at the target.

7. The array of claim 5, wherein the phase shifts of each of the plurality of antenna elements are chosen based on an ideal phase, and wherein each of the selective antenna elements produces a respective beam of microwave radiation having a phase offset from the ideal phase greater than other ones of the plurality of antenna elements.

8. The array of claim 1, wherein the array is designed for use in scanning an object by capturing successive microwave images of targets associated with the object, and wherein the minimum number of phase shift changes is optimized by selecting an order for the successive microwave images.

9. The array of claim 1, wherein the parameter to be optimized is a ratio of a main lobe area to side lobe areas.

10. The array of claim 1, wherein the phase shifts programmed for each of the plurality of antenna elements to direct the beam of microwave radiation to the target form a pattern, and wherein the parameter to be optimized is a metric associated with digital compression of bits describing the pattern.

11. A microwave imaging system for capturing a microwave image of a target, comprising:
    a microwave source for providing microwave radiation for illuminating the target; and
    a reflector antenna array including a plurality of antenna elements, each of said antenna elements being capable of being programmed with a respective phase shift to reflect the microwave radiation towards the target in a transmit beam such that the microwave radiation from each of the plurality of antenna elements arrives at the target substantially in-phase;
    wherein the phase shift of selective ones of the plurality of antenna elements is altered to optimize a minimum number of phase shift chances in the array between successive microwave images.

12. The system of claim 11, wherein the antenna elements are further capable of receiving reflected microwave illumination reflected from the target in a receive beam and reflecting the receive beam towards a microwave receiver.

13. The system of claim 12, wherein the parameter to be optimized is a ratio of constructive interference of the microwave radiation at the target and destructive interference of the microwave radiation at a microwave receiver.

14. The system of claim 13, wherein the ratio is optimized by increasing the destructive interference at the microwave receiver without a corresponding decrease in the constructive interference at the target.

15. The system of claim 13, wherein the phase shifts of each of the plurality of antenna elements are chosen based on an ideal phase, and wherein each of the selective antenna elements produces a respective beam of microwave radiation having a phase offset from the ideal phase greater than other ones of the plurality of antenna elements.

16. The system of claim 11, wherein the array is designed for use in scanning an object by capturing successive microwave images of targets associated with the object, and wherein the minimum number of phase shift changes is optimized by selecting an order for the successive microwave images.

17. The system of claim 11, wherein the parameter to be optimized is a ratio of a main lobe area to side lobe areas.

18. The system of claim 11, wherein the phase shifts programmed for each of the plurality of antenna elements to direct the beam of microwave radiation to the target form a pattern, and wherein the parameter to be optimized is a metric associated with digital compression of bits describing the pattern.

19. A method for optimizing operation of a microwave imaging system for capturing a microwave image of a target, comprising:
    providing an array including a plurality of programmable microwave antenna elements:
    designing a pattern of respective phase shifts for each of the microwave antenna elements to direct a transmit beam of microwave radiation towards the target; and
    altering the phase shift of selective ones of the plurality of antenna elements in the pattern to optimize a minimum number of phase shift changes in the array between successive microwave images; and
    applying the altered phase shifts to the array.

20. The method of claim 19, wherein the parameter to be optimized is a ratio of constructive interference of the microwave radiation at the target and destructive interference of the microwave radiation at a microwave receiver.

21. The method of claim 20, wherein the altering further includes increasing the destructive interference at the microwave receiver without a corresponding decrease in the constructive interference at the target.

22. The method of claim 20, wherein the designing further includes selecting the phase shills of each of the plurality of antenna elements based on an ideal phase, and wherein the altering further includes altering the phase shift of the selective antenna elements that produce a respective beam of microwave radiation having a phase offset from the ideal phase greater than other ones of the plurality of antenna elements.

23. The method of claim 19, wherein the altering further includes selecting an order for the successive microwave images to optimize the minimum number of phase shift changes therebetween.

24. The method of claim 19, wherein the parameter to be optimized is a ratio of a main lobe area to side lobe areas.

25. The method of claim 19, wherein the parameter to be optimized is a metric associated with digital compression of bits describing the pattern.

* * * * *

UNITED STATES PATENT AND TRADEMARK OFFICE
CERTIFICATE OF CORRECTION

| | | |
|---|---|---|
| PATENT NO. | : 8,289,199 B2 | Page 1 of 1 |
| APPLICATION NO. | : 11/089298 | |
| DATED | : October 16, 2012 | |
| INVENTOR(S) | : Izhak Baharav et al. | |

It is certified that error appears in the above-identified patent and that said Letters Patent is hereby corrected as shown below:

In column 15, line 34, in Claim 11, delete "chances" and insert -- changes --, therefor.

In column 16, line 19, in Claim 19, delete "elements:" and insert -- elements; --, therefor.

In column 16, line 36, in Claim 22, delete "shills" and insert -- shifts --, therefor.

Signed and Sealed this
Eleventh Day of December, 2012

David J. Kappos
*Director of the United States Patent and Trademark Office*